(12) United States Patent
Chang

(10) Patent No.: US 6,557,227 B2
(45) Date of Patent: May 6, 2003

(54) HARD PIPE CUTTING EQUIPMENT

(75) Inventor: Shin-Fa Chang, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/900,131

(22) Filed: Jul. 9, 2001

(65) Prior Publication Data

US 2003/0005562 A1 Jan. 9, 2003

(51) Int. Cl.⁷ .............................. B22Q 39/02; B23B 5/14
(52) U.S. Cl. ............................ 29/33 T; 82/59; 82/101; 409/138
(58) Field of Search ......................... 29/33 T, 33 D, 29/566; 82/46, 59, 101, 113; 409/139, 138, 175, 203; 300/97

(56) References Cited

U.S. PATENT DOCUMENTS

| | | | | |
|---|---|---|---|---|
| 3,613,489 A | * | 10/1971 | Randich | 82/101 |
| 4,430,913 A | * | 2/1984 | Williamson | 82/59 |
| 4,608,755 A | * | 9/1986 | Braasch | 30/97 |
| 4,905,552 A | * | 3/1990 | Shinbori | 82/46 |
| 5,553,526 A | | 9/1996 | Kusakabe et al. | |
| 5,609,081 A | * | 3/1997 | Lin | 82/101 |
| 5,860,305 A | | 1/1999 | Castricum | |
| 5,881,616 A | | 3/1999 | Nanzai | |
| 5,894,771 A | * | 4/1999 | Braun et al. | 82/113 |

FOREIGN PATENT DOCUMENTS

| | | | | |
|---|---|---|---|---|
| EP | 425994 | * | 5/1991 | 29/33 T |
| GB | 2176140 | * | 12/1986 | 29/33 T |

* cited by examiner

*Primary Examiner*—William Briggs
(74) *Attorney, Agent, or Firm*—Stevens, Davis, Miller & Mosher, LLP

(57) ABSTRACT

The present invention relates to a novel cutting equipment, which automatically cuts hard plastic pipes produced from an extruder, having a table, an input V shape leading wheel, an input fixing clamp apparatus mechanism, a cutting mechanism, a bearing transmission mechanism, an output fixing clamp apparatus mechanism, a V shape leading plate, a leading wheel, a cuttings collector, and an electric control system, which are assembled to a novel means of a hard pipe cutting machine.

1 Claim, 12 Drawing Sheets

HARD PIPE CUTTING EQUIPMENT

BACKGROUND OF THE INVENTION

1. Field of the Invention

The present invention relates to a cutting machine, in particular, which is capable of automatically cutting hard plastic pipes produced from an extruder.

2. Description of the Related Prior Arts

The conventional hard pipe cutting equipment is generally manual, or semi-automatic, or automatic, wherein one of the automatic equipment is to cut, for small diameter pipes only, with a disc cutting apparatus (shown as FIG. 1) by way of rolling (shown as FIG. 2) which is not able to cut big diameter pipes. In addition, said equipment does not have chamfer means so that it can only cut without chamfering which makes it disable to cut medium and big diameter hard pipes. As for the semi-automatic equipment, which executes cutting by the coordination of a simple mechanism and a large cutting apparatus, the product of which needs to be further processed. The procedure is trivial and without efficiency. Besides, the operation environment is apt to be polluted by cuttings since the cutting operation is exposed to the atmosphere, which is consequently hazardous to operators.

SUMMARY OF THE INVENTION

The present invention discloses, aiming to resolve problems of prior arts, a novel cutting equipment with a high cutting efficiency and quality, which is suitable for various diameter and thickness of hard pipe to meet the requirement of automatic production. The present invention owns advantages of automation, high efficiency, manpower saving, cost reduction, and quality assurance. The characteristics of the present invention are as follows:

1. The cutting and input is adjusted and controlled by air-oil transfer circulation depending on cutting rate, which completes hard pipe cutting operation within a preset time period disregard of the thickness and productivity of hard pipes.
2. The hard pipe is automatically cut and chamfered by turning or is automatically rolled without cuttings under the coordination of replaceable cutting blade, chamfering blade or disk blade of cutting mechanism.
3. While the hard pipe is cut by turning, a centrifugal cuttings collector is used to collect cuttings so as to prevent the operation environment being polluted, which makes the present invention novel in terms of high efficiency, high quality, cleanness, multiple applications.

The characteristic of the present invention is to combine and improve the conventional semi-automatic and automatic hard pipe cutting equipments. The hard pipe cutting equipment is a novel means comprising a table 52, an input V shape leading wheel 22, an input linking-up clamp apparatus fixing mechanism, a cutting mechanism, a bearing linking-up mechanism, an output linking-up clamp apparatus fixing mechanism, a V shape leading plate, a leading wheel, a cuttings collector, and an electric control system. The cutting procedure of the novel means of the present invention is briefly described as follows:

The hard pipe, led from the leading equipment of preceding stage, is cut automatically in a preset cutting rate depending on the diameter of the pipe. Then, adjust and control the cutting blade and chamfering blade in accordance with the cutting rate by the design of air-oil transfer circulation to set an appropriate input so that the turning of hard pipe will not be affected by the production rate of the hard pipe. The cuttings are collected by a centrifugal collector. The cutting blade and chamfering blade, which are replaceable, are manufactured either in one body or separately depending on the requirement of production. The cutting and chamfering of the pipe can be accomplished at the same time and the cut surface can refrain from double cut trace. This equipment is not only suitable for various diameters of pipe but also suitable for various thickness of pipe. This equipment also owns advantages of high efficiency, cleanliness, and multiple purposed applications.

DETAILED DESCRIPTION OF THE PREFERRED EMBODIMENT

Figure 1:
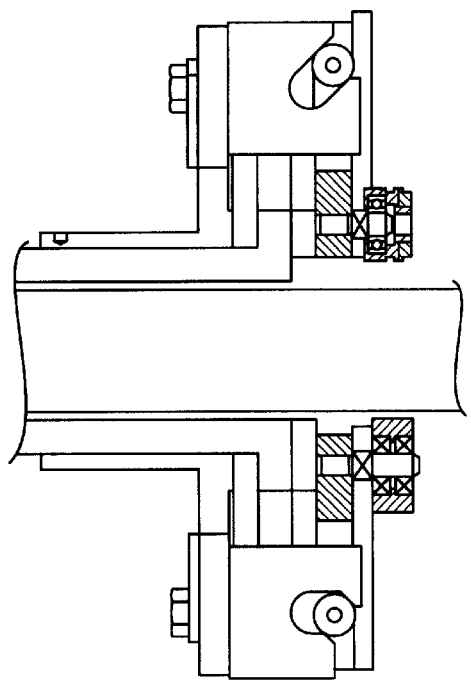
FIG. 1 is a conventional disc cutting apparatus.
Figure 2:
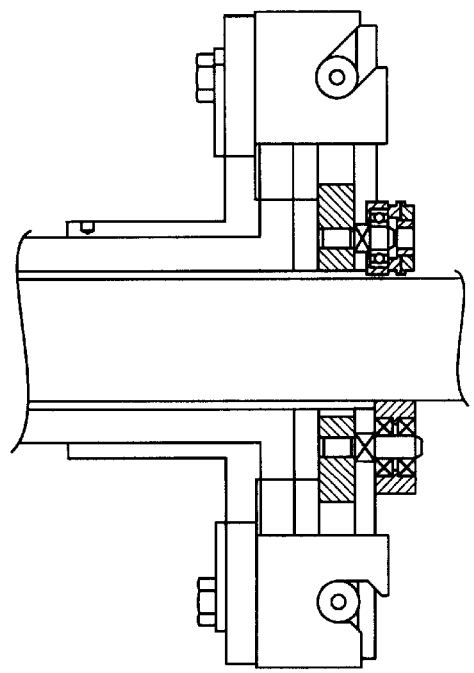
FIG. 2 is a conventional rolling apparatus.

Referring to the attached drawings, the cutting skill contents of the novel means of the hard pipe cutting equipment are disclosed as follows:

Adjust variable frequency driving motor 51 of the present invention according to the diameter, thickness, and wanted chamfering depth of the produced hard pipe 21 which is led by the preceding leading device; and control the cutting slide seat fixing rotating disc 31 at an appropriate rotation rate. Then, adjust the position of the cutting blade sliding seat 33 and the chamfering blade sliding seat 34 to coordinate with the successive multiple-unloading frame 69 so as to do spacing cut and multiple-unloading outlet.

Figure 3:
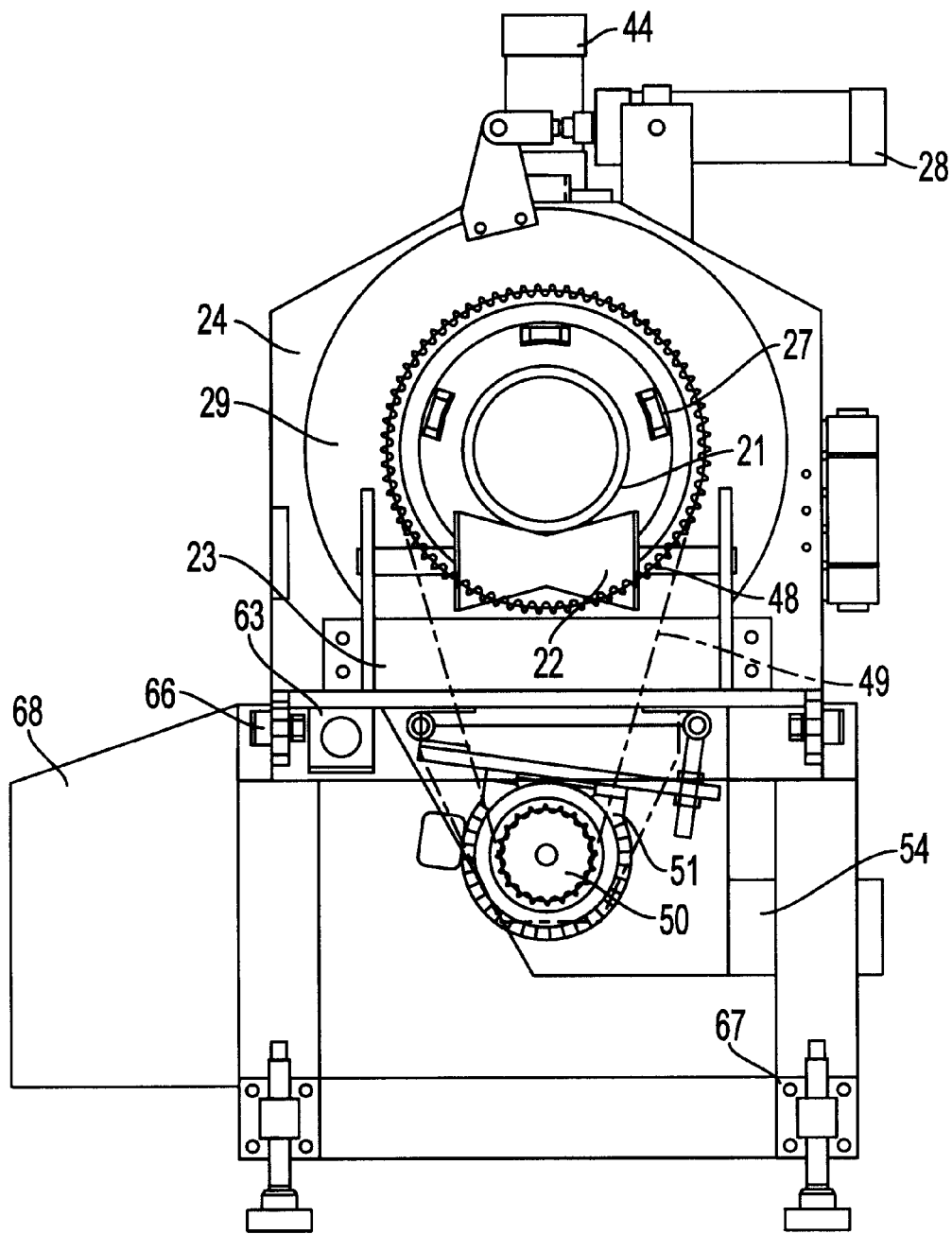
FIG. 3 is a front view assembly drawing of the present invention.

FIG. 3, which is a front view assembly drawing of the present invention, shows the hard pipe 21 is led by the front end input V shape leading wheel 22 into cutting operation. The hard pipe is held steadily by the input clamp apparatus fixing mechanism (FIG. 6) and the output clamp apparatus fixing mechanism (FIG. 10) so as to prevent any bias from happening. Meanwhile, the hard pipe consecutively enters into cutting mechanism (FIG. 7), transmission mechanism (FIG. 8), main table (FIG. 9), output clamp apparatus mechanism, output V shape leading plate, leading wheel;

until the hard pipe reaches the multiple-unloading frame 69 of the rear end and touches the limit switch 70 to release a start signal of spacing cut and to initiate the circuit control system 68 to coordinate with the production rate of production line. Said mechanisms form an automatic equipment which is able to fix, to cut, to chamfer, which sufficiently improve the efficiency. In addition, the overall cutting operation is executed in a close space (safety shield 53); cuttings produced from turning are collected by the cuttings collector 55 through the cuttings collecting wind shield 54; whereby said hard pipe cutting equipment meets the requirement of environmental protection of being clean and noiseless.

Figure 4:
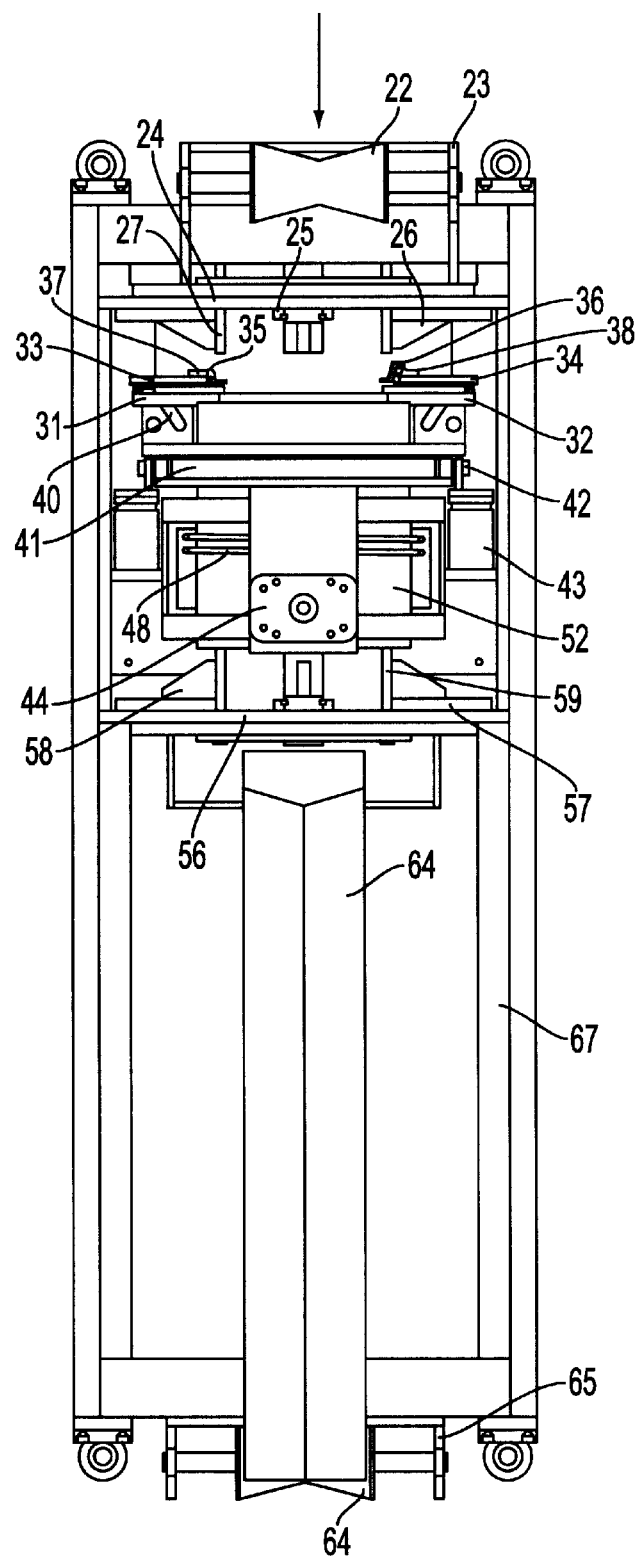
FIG. 4 is a top view assembly drawing of the present invention.
Figure 5:
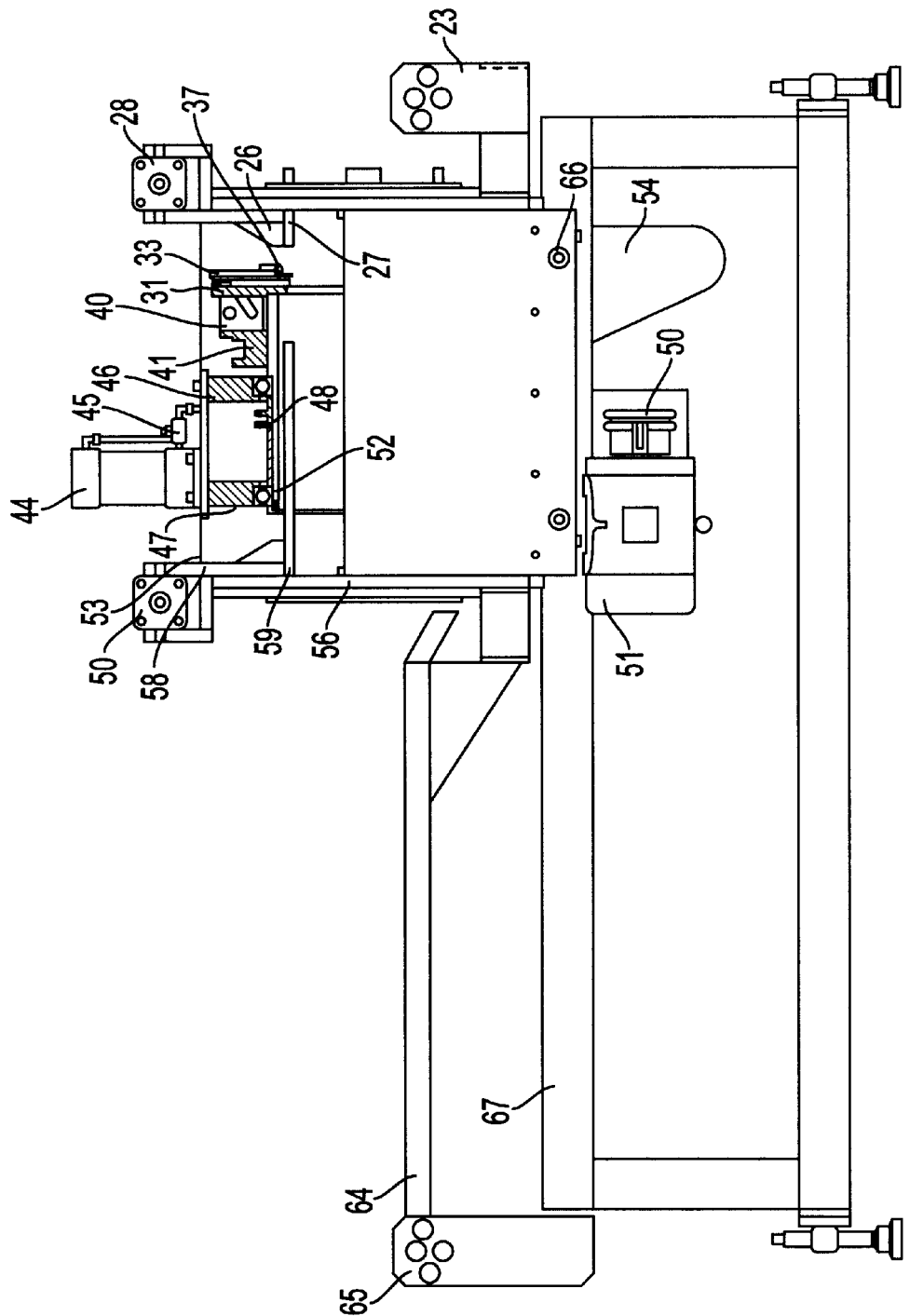
FIG. 5 is a side view assembly drawing of the present invention.

FIG. 4 and FIG. 5 are top view assembly drawing and side view assembly drawing of the present invention. The assembly structure of the present invention is that both sides of the table 67 are fitted with the main table supporting roll wheel 66 and the base plate 71 which is used to connect and fix each mechanism. The function of the base plate is to combine the input clamp apparatus mechanism (FIG. 6), the transmission mechanism (FIG. 7), cutting mechanism (FIG. 8), the main table (FIG. 9), the table and the cuttings collector (FIG. 10), the output clamp apparatus fixing mechanism (FIG. 11); the purpose of-which is to have the main table supporting roll wheel 66 go forward and return in accordance with the production rate of the production line.

Figure 6:
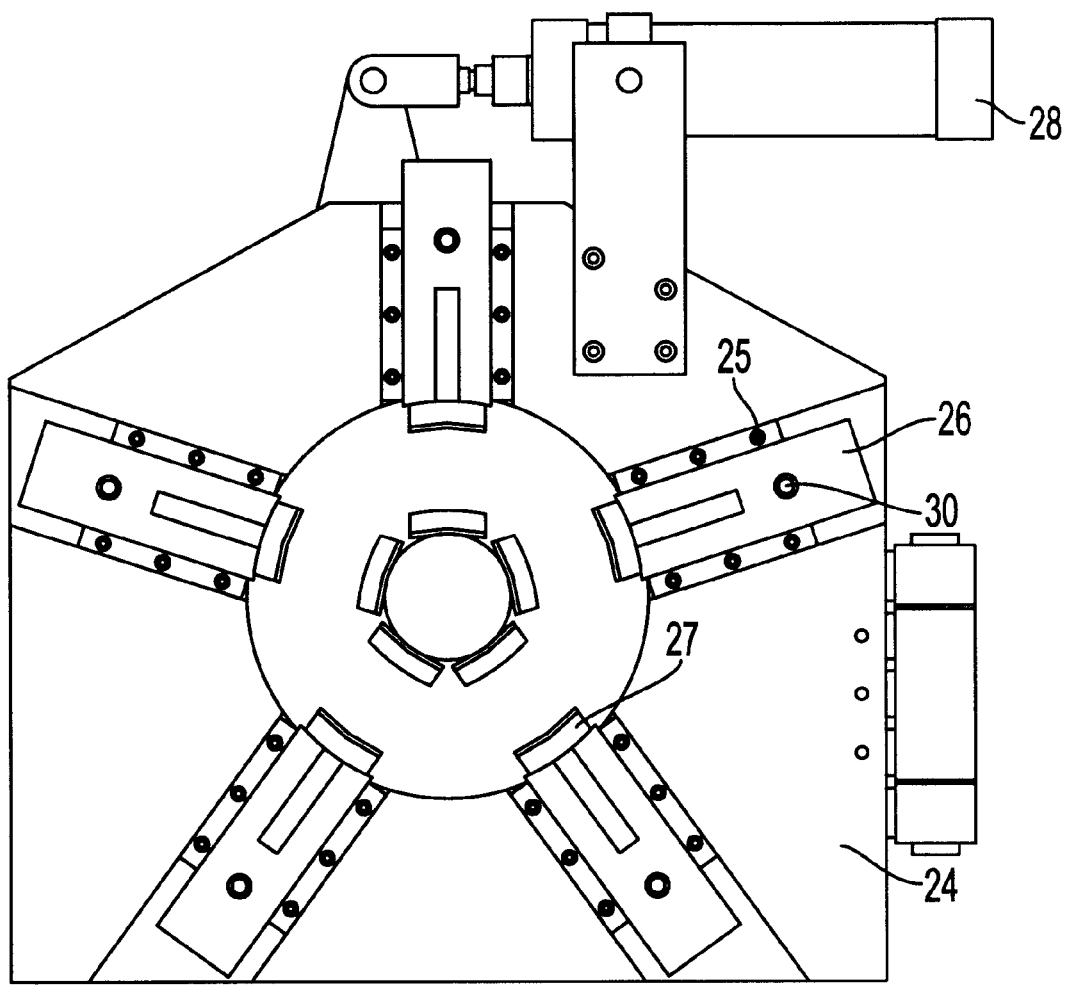
FIG. 6 is an input clamp apparatus fixing mechanism assembly drawing of the present invention.

FIG. 6 is an assembly drawing of the input clamp apparatus fixing mechanism of the present invention, wherein the input clamp apparatus fixing seat 24 combines the odd-numbered input clamp apparatus sliding track 25, the input clamp apparatus sliding seat 26, the input clamp apparatus 27 and the input clamp apparatus drive rotating disc 29, and the input clamp apparatus driving cylinder 28. The input clamp apparatus driving cylinder 28 drives the input clamp apparatus drive rotating disc 29 to drive several input clamp apparatus drive rolling wheels 30 to further drive the input clamp apparatus sliding seat 26 and the input clamp apparatus 27 to hold the hard pipe 21, the function of which is that both the hard pipe 21 and the cutting sliding seat fixing rotating disk 31 are concentric while cutting and no problems such as bias and displacement will happen, i.e., the function of which is positioning. A plurality of clamp apparatus 27 simultaneously hold the hard pipe 21 so as to increase the holding capability and to maintain concentric situation in order to refrain the hard pipe 21 from deforming and displacement; consequently, this increases the cutting quality, which constitutes the characteristics of the present invention.

Figure 7:
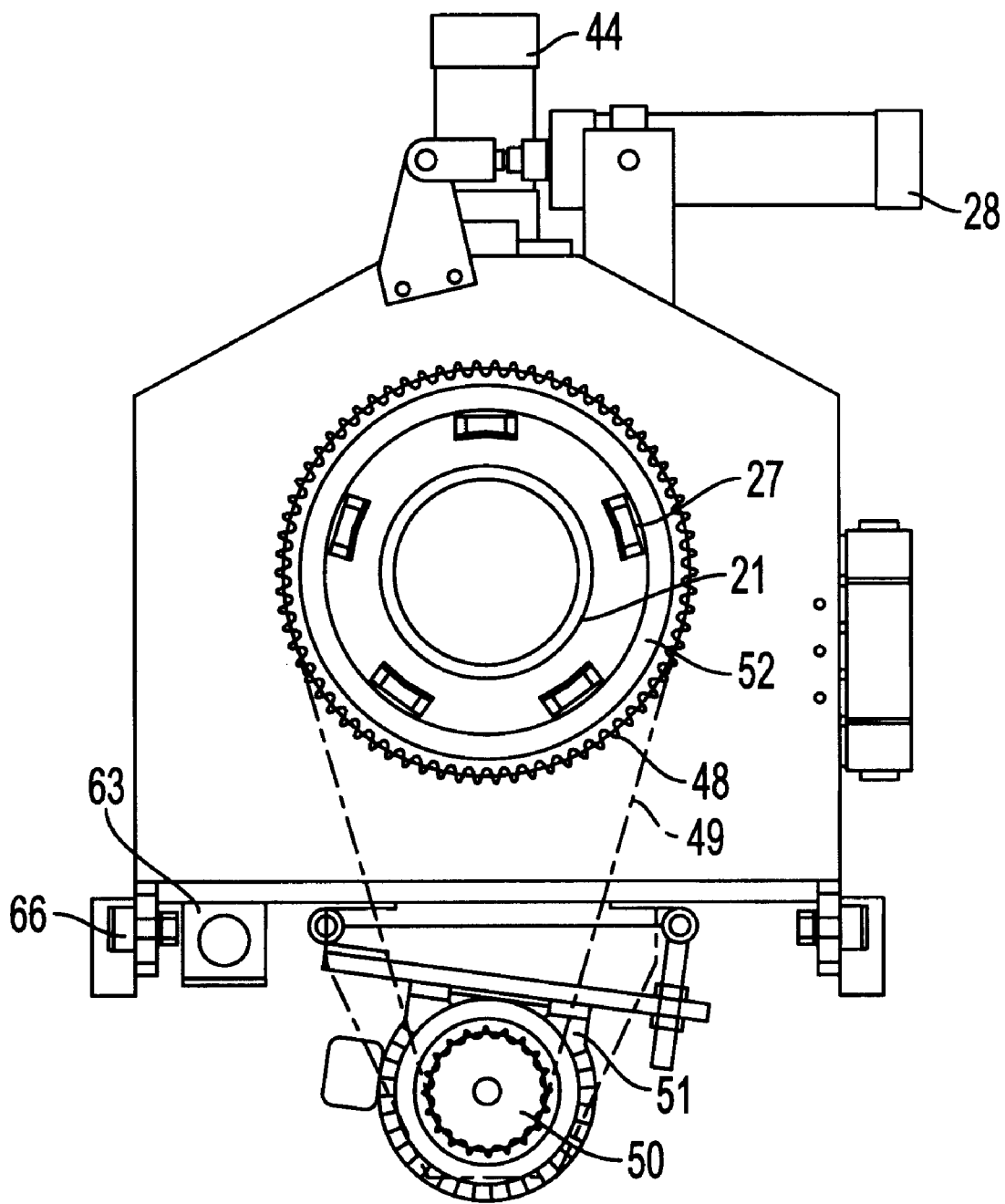
FIG. 7 is a transmission mechanism assembly drawing of the present invention.
Figure 8:
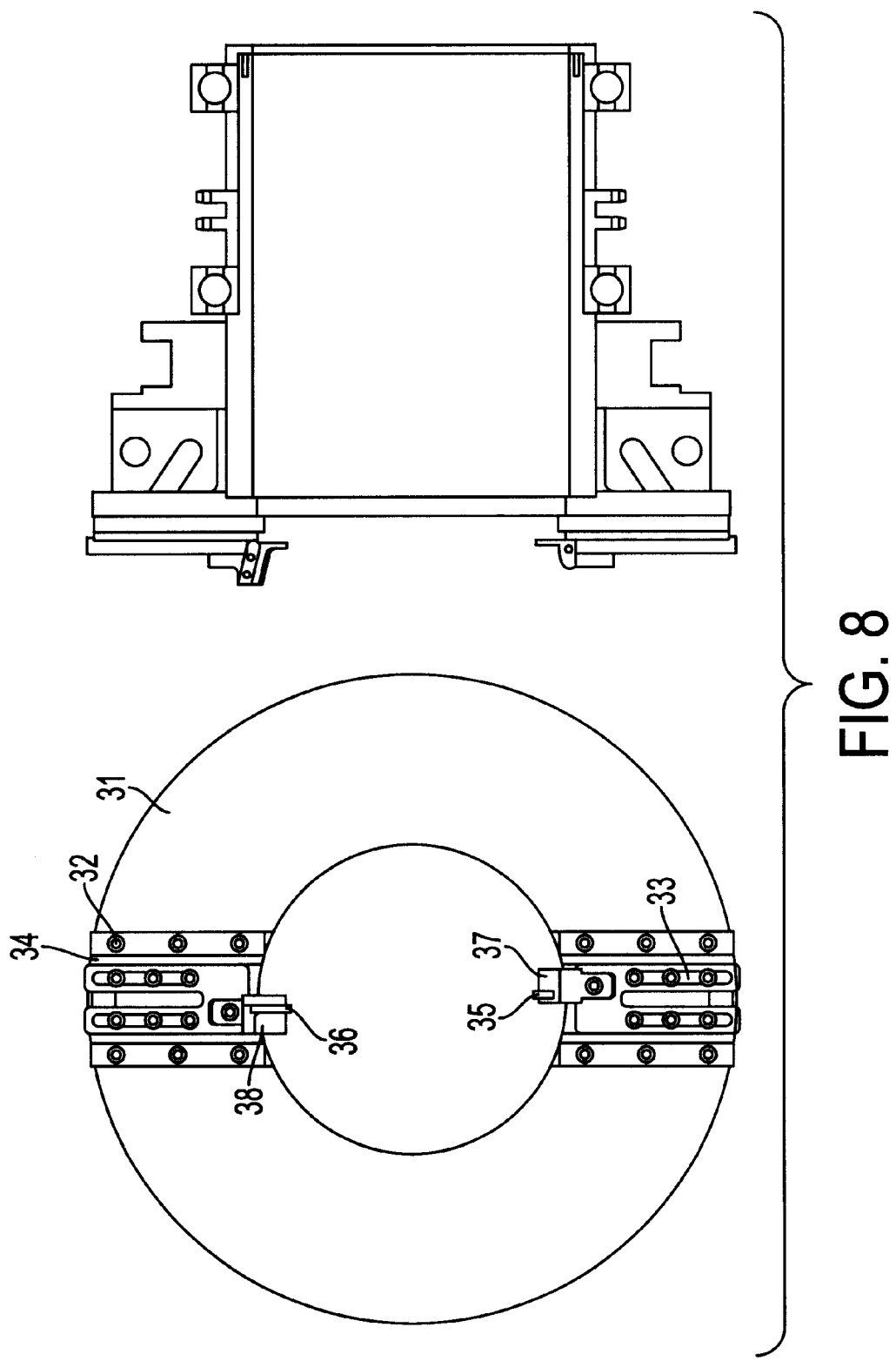
FIG. 8 is a cutting blade and chamfering blade assembly drawing of the cutting mechanism of the present invention.

FIG. 7 is the transmission mechanism assembly drawing of the present invention. The transmission mechanism mainly combines the variable frequency driving motor 51 which operates to drive the bottom gear sprocket 50, the chain 49, and the top gear sprocket 48, wherein the top gear sprocket 48 combines and rotates harmoniously with the rotation axle center 52 which is hid in the main table (FIG. 8). Meanwhile, the blade-feeding cylinder 43 at both sides starts, in accordance with the operation of the variable frequency driving motor 51 and with the movement of the bottom plate 71, to drive the blade-feeding roll wheel 42 to push the blade-feeding pushing rotating disc 41 to move forward; at the same time, the twin-slope blade-feeding guide block 40 fitted thereon moves forward accordingly; and the twin-slope blade-feeding guide block 40 which is inserted in the cutting slide seat fix rotating disc 31 rotates accordingly.

FIG. 8 is an assembly drawing of the cutting blade, and the chamfering blade of the present invention. While the transmission mechanism (FIG. 7) operates, the blade-feeding pushing rotating disc 41 rotates accordingly; this further drive two sets of twin-slope blade-feed guide block 40 to penetrate through the cutting slide seat fix rotating disc 31 which has two stripe shape grooves. Moreover, the cutting slide seat fix rotating disc 31 is fitted with the cutting blade and the chamfering blade, wherein the cutting blade is assembled with a sliding track 32, a cutting blade sliding seat 33, a cutting blade seat 37, and a replaceable cutting blade 35. The chamfering blade is assembled with a sliding track 32, a chamfering blade sliding seat 34, a chamfering blade seat 38, and a replaceable chamfering blade 36. The grooves in both the cutting blade sliding seat 33 and the chamfering blade sliding seat 34 are fitted with a driving roll wheel 39 which is also fitted in the groove, which has different slope, of the twin-slope blade-feeding guide block 40. While the blade-feeding cylinder 43 pushes forward, the blade-feeding roll wheel 42 pushes the blade-feeding pushing rotating disc 41 to move forward; and the twin-slope blade-feeding guide block 40 fitted thereon drives the driving roll wheel 39 to move forward to the center of the main table (FIG. 9), which also drives the cutting blade sliding seat 33 and the chamfering blade sliding seat 34 to move to the center of the main table (FIG. 9); the cutting and chamfering operations are accomplished during the movement, which constitutes the characteristics of the present invention.

Figure 9:
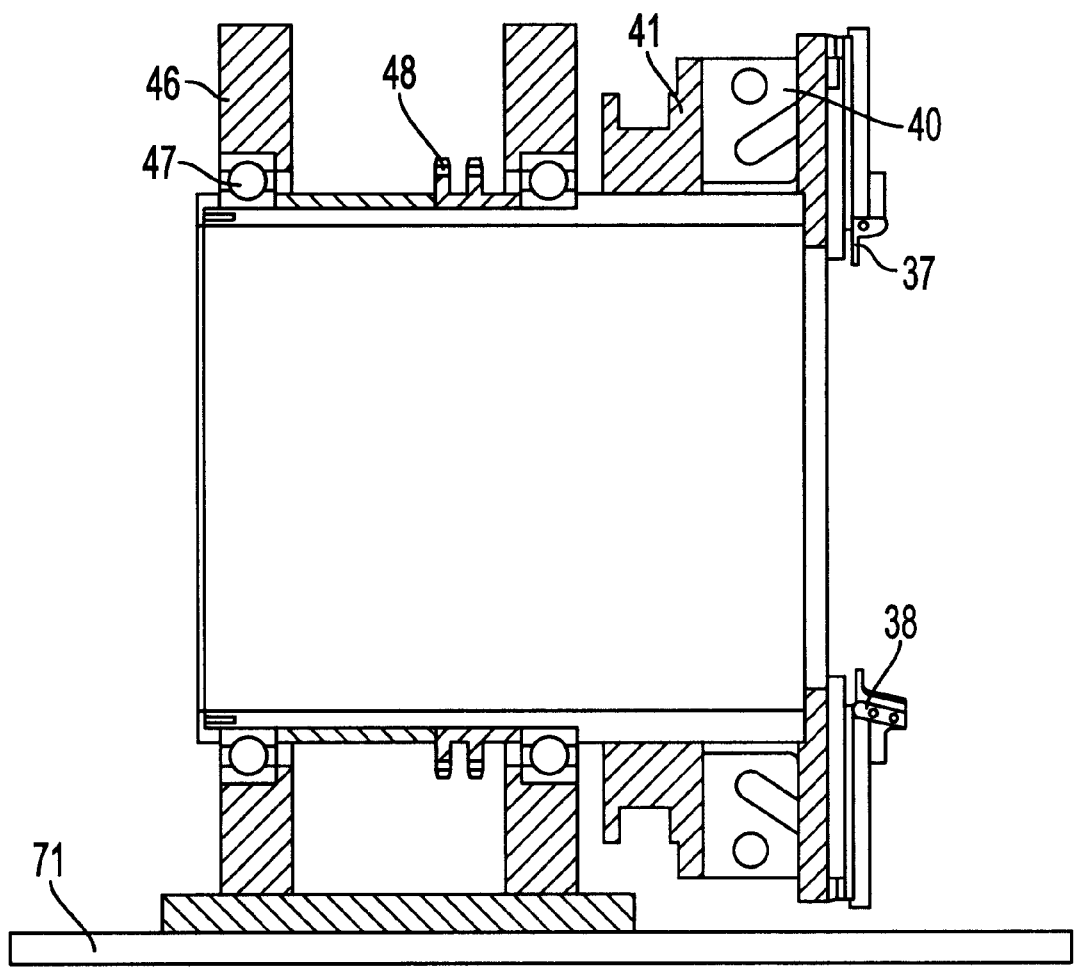
FIG. 9 is a main table assembly drawing of the present invention.

FIG. 9 is an assembly drawing of the main table of the present invention. While the transmission mechanism (FIG. 7) operates, the bottom gear sprocket 50 is driven to rotate; the chain 49, and the top gear sprocket 48 are connected to the rotation axle center 52 which is hid in the main table (FIG. 9); and the cutting sliding seat fix rotating disc 31 and the blade-feeding pushing rotating disc 41 are all fixed to and linking-up with the rotation axle center 52, which assemble to the main table.

Figure 10:
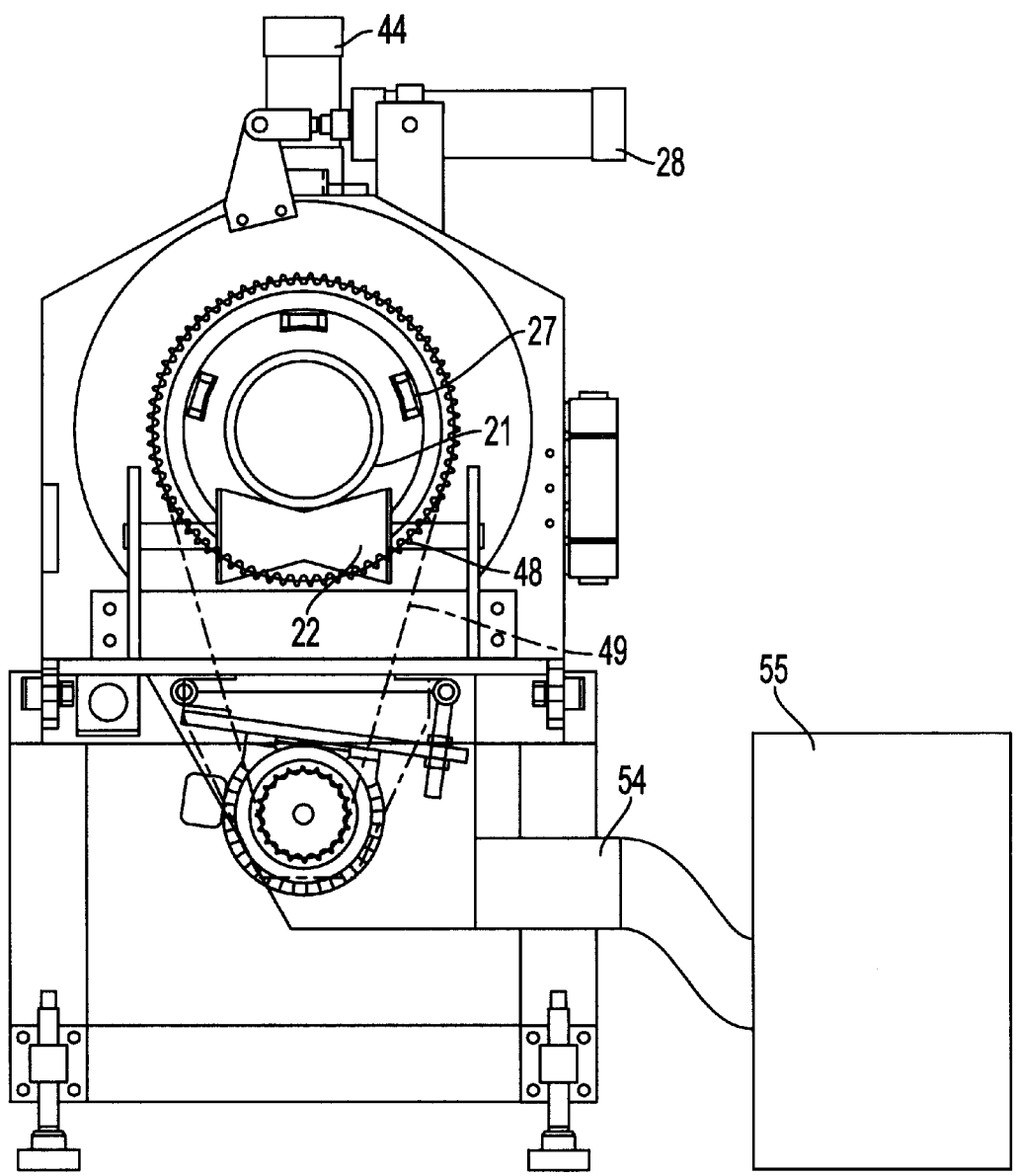
FIG. 10 is a table and cuttings collector assembly drawing of the present invention.

FIG. 10 is an assembly drawing of the table and the cuttings collector of the present invention. The cuttings produced from turning are collected by the cuttings collector 55 which is connected to the cuttings collecting wind shield 54 installed below the bottom plate 71. The cuttings do not fall down to the floor since the overall cutting operation takes place in a closed space (safety shield 53); besides, all the cuttings are collected by the cuttings collector 55. In addition, the turning operation of the cutting blade and the chamfering blade will not produce dust, which is an extra advantage for pollution control.

Figure 11:
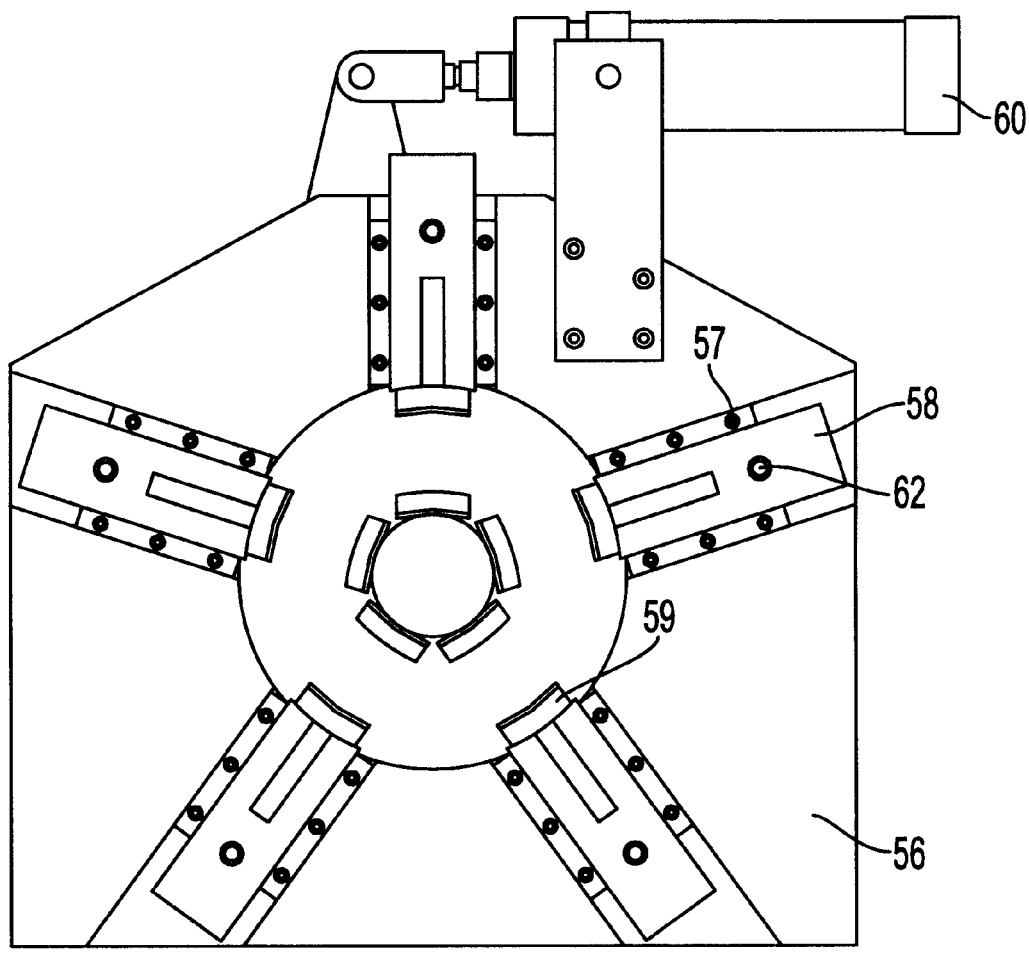
FIG. 11 is an output clamp apparatus fixing mechanism assembly drawing of the present invention.

FIG. 11 is an assembly drawing of the output clamp apparatus fixing mechanism of the present invention, which comprises an output clamp apparatus fixing seat 56, a plurality of output clamp apparatus sliding track 57, an output clamp apparatus sliding seat 58, an output clamp apparatus 59, an output clamp apparatus drive rotating disc 61, and an output clamp apparatus driving cylinder 60. The output clamp apparatus driving cylinder 60 drives the output clamp apparatus drive rotating disc 61 to further drive a plurality of output clamp apparatus driving roll wheels 62 to further drive the output clamp apparatus sliding seat 58 and the output clamp apparatus 59 to hold the hard pipe 21, the function of which is that both the hard pipe 21 and the main table (FIG. 9) are concentric while cutting and no problems such as bias and displacement will happen, i.e., the function of which is positioning. A plurality of longer output clamp apparatus 59 simultaneously hold the hard pipe 21 at several different points to shorten the distance between holding points and turning positions so as to improve the holding capability and the cutting quality, which constitutes the characteristics of the present invention.

Figure 12:
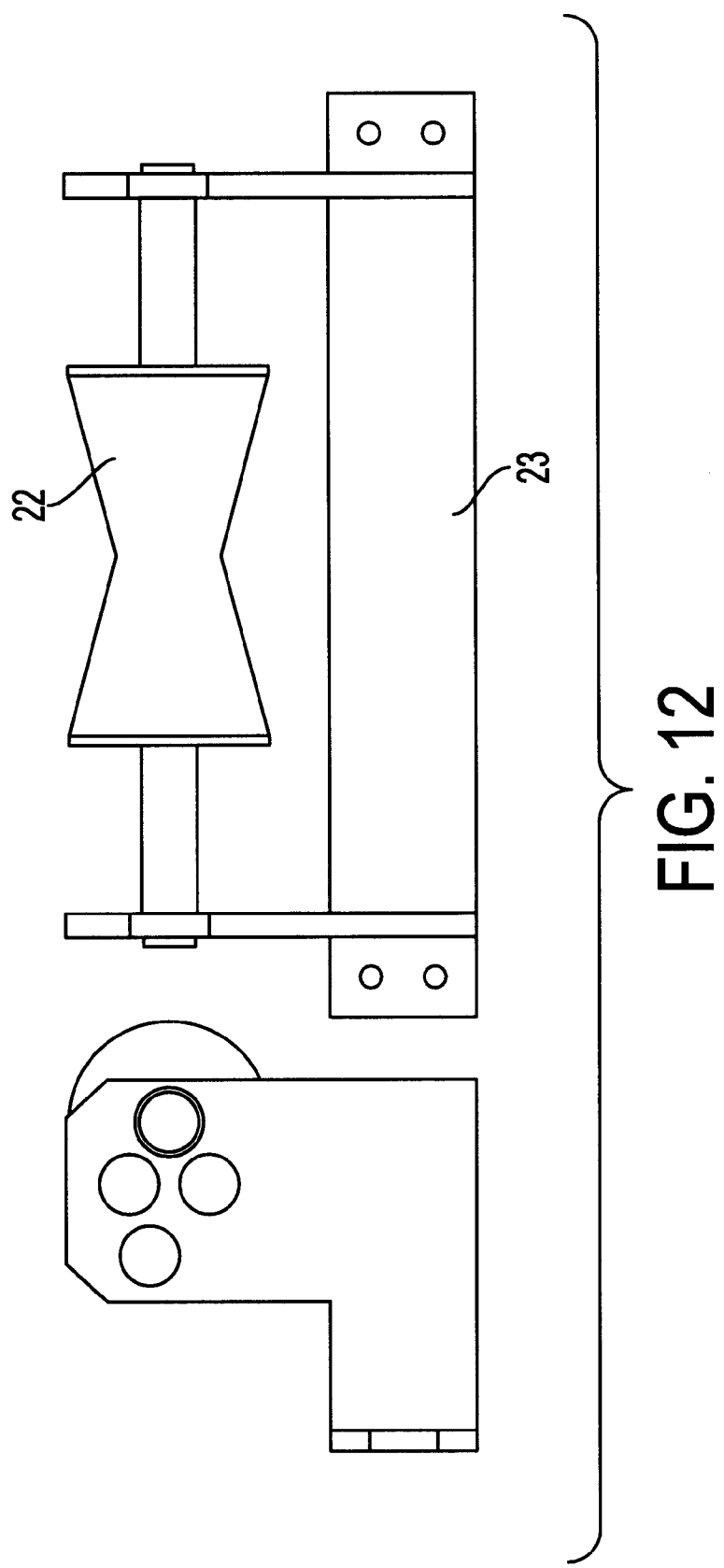
FIG. 12 is an input V shape roll wheel assembly drawing of the present invention.
Figure 13:
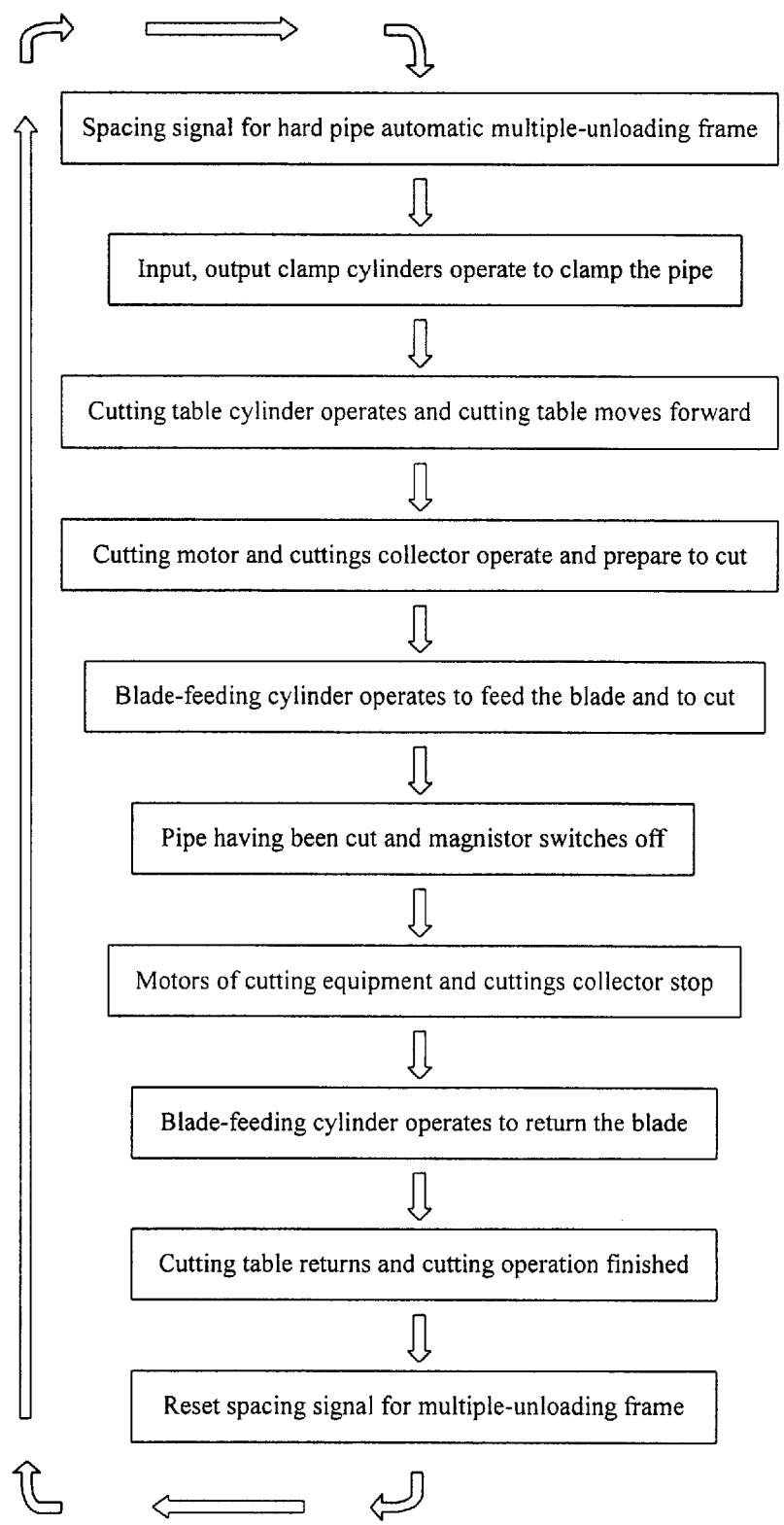
FIG. 13 is a schematic drawing showing the automatic operation procedure of the present invention.

FIG. 12 is an assembly drawing of the input V shape rolling wheel of the present invention, which comprises an input V shape leading wheel and an input V shape leading wheel fixing seat. The function is to-prevent the hard pipe 21, while being input of being cut, from colliding with the input clamp apparatus fixing mechanism (FIG. 5) and with the replaceable cutting blade and the chamfering blade fitted to the cutting sliding seat fix rotating disc 31; the blade may be damaged otherwise.

EXAMPLE 1

While it is intended to produce a two inches hard pipe, the two inches hard pipe is led first by a leading machine at the previous stage; then, the hard pipe goes through the front-end input V shape leading wheel, the input clamp apparatus fixing mechanism, the transmission mechanism, the cutting mechanism, the main table, the output clamp apparatus fixing mechanism, the output V shape leading plate, the leading wheel, finally reaches the multiple-unloading frame at the rear stage and touches the limit switch for spacing and cutting so as to initiate the electric control system for cutting, meanwhile the input clamp apparatus fixing mechanism and the output clamp apparatus fixing mechanism operate to hold the hard pipe, and to initiate the variable frequency driving motor to operate; the blade-feeding cylinder drives the blade-feeding roll wheel according to the preset input so as to push the blade-feeding pushing rotating disc move forward to further drive the twin-slope blade-feeding guiding block. Thereafter, the cutting blade acts cutting and chamfering on the hard pipe according to the preset input. Meanwhile, the cutting table moves on the table in accordance with the production rate of the hard pipe, and the cuttings collector collects the cuttings by using cuttings collecting wind shield, which conclude the overall cutting operation of the hard pipe.

EXAMPLE 2

While it is intended to produce an eight inches hard pipe, the eight inches hard pipe is led first by a leading machine at the previous stage; then, the hard pipe goes through the front-end input V shape leading wheel, the input clamp apparatus fixing mechanism, the transmission mechanism, the cutting mechanism, the main table, the output clamp apparatus fixing mechanism, the output V shape leading plate, the leading wheel, finally reaches the multiple-unloading frame at the rear stage and touches the limit switch for spacing and cutting so as to initiate the electric control system for cutting, meanwhile the input clamp apparatus fixing mechanism and the output clamp apparatus fixing mechanism operate to hold the hard pipe, and to initiate the variable frequency driving motor to operate; the blade-feeding cylinder drives the blade-feeding roll wheel according to the preset input so as to push the blade-feeding pushing rotating disc move forward to further drive the twin-slope blade-feeding guiding block. Thereafter, the cutting blade acts cutting and chamfering on the hard pipe according to the preset input. Meanwhile, the cutting table moves on the table in accordance with the production rate of the hard pipe, and the cuttings collector collects the cuttings by using cuttings collecting wind shield, which conclude the overall cutting operation of the hard pipe.

To summarize what is said above, the skills utilized by the present invention is totally different from those of the conventional ones. The automatic design of the present invention tremendously increases the efficiency of hard pipe cutting. The cutting and chamfering operation can be done simultaneously. The operating environment is as clean as not to jeopardize the operators. The present invention is patentable due to its novelty.

What is claimed is:

1. A cutting apparatus for variable diameter pipe, comprising:

an input clamp mechanism and an output clamp mechanism, each of the input and output clamp mechanisms comprising a fixing seat, a rotating disc, and a driving cylinder, each fixing seat having a plurality of sliding tracks, each sliding track housing a sliding seat and a rolling wheel that moves the corresponding sliding seat along a sliding axis of the respective sliding track, each sliding seat having a clamp at one end for gripping the pipe, each of the driving cylinders drives the movement of the corresponding rotating disc, the movement of each rotating disc drives the movement of the corresponding set of rolling wheels, the movement of each set of rolling wheels drives the movement of the corresponding set of sliding seats, and the movement of each set of sliding seats moves the corresponding set of clamps radially inward toward or outward from the pipe in accordance with a drive direction of the corresponding driving cylinder so that the corresponding set of clamps may concentrically grip and release pipes of variable diameters;

a cutting disc for cutting and chamfering the pipe, the cutting disc comprising a chamfering sliding track, a chamfering sliding seat that slides within the chamfering sliding track along a radial direction of the cutting disc, a chamfering blade attached to an end of the chamfering blade seat, a cutting sliding track, a cutting sliding seat that slides within the cutting sliding track along the radial direction of the cutting disc, and a cutting blade attached to an end of the cutting blade seat;

a cutting mechanism disposed between the input and output clamp mechanisms, the cutting mechanism comprising a blade-feeding cylinder, a blade-feeding disc, a plurality of twin-slope guide blocks, and the cutting disc, the cutting disc interconnected with the.blade-feeding disc through the plurality of twin-slope guide blocks and having a common axis of rotation with the blade-feeding disc, the blade-feeding cylinder displaces the blade-feeding disc relative to the cutting disc along the common axis of rotation, the relative displacement of the blade-feeding disc and the cutting disc moves the cutting sliding seat within the cutting sliding track in accordance with a slope of the twin-slope guide blocks, the relative displacement of the blade-feeding disc and the cutting disc moves the chamfering sliding seat within the chamfering sliding track in accordance with the slope of the twin-slope guide blocks, the twin-slope guide blocks move the cutting sliding seat and the chamfering sliding seat inwardly along the radial axis of the cutting disc toward the rotational axis of the rotating disc as the distance between the cutting disc and the blade-feeding disc decreases, the twin-slope guide blocks move the cutting sliding seat and the chamfering sliding seat outwardly along the radial axis of the cutting disc away from the rotational axis of the rotating disc as the distance between the cutting disc and the blade-feeding disc increases, the blade-feeding cylinder displaces the cutting disc and the blade-feeding disc relative to one another to move the cutting and chamfering blades into and out of contact with the variable diameter pipe;

a transmission mechanism, comprising a variable frequency driving motor, a bottom gear sprocket, a top gear sprocket interconnected with the blade-feeding disc and having an axis of rotation in common with the blade-feeding disc and the cutting disc, and a chain that interconnects the bottom and top gear sprockets, the variable frequency driving motor drives the bottom gear sprocket to rotate, the rotation of the bottom gear sprocket drives the rotation of the chain around the bottom and top gear sprockets and thereby drives a common rotation of the top gear sprocket, the blade-feeding disc, and the cutting disc for circumferentially cutting and chamfering the pipe;

a cuttings and dust collector that encloses the cutting mechanism and collects material removed from the pipe by the cutting mechanism;

a sliding table that interconnects the input and output clamps, the cutting mechanism, and the transmission mechanism, the sliding table slides along a pipe-feeding axis at a pipe-feeding rate so that the input and output clamps may securely grip the pipe as the cutting mechanism cuts and chamfers the pipe; and a control circuit that controls the operation of the input and output clamps, the cutting mechanism, the transmission mechanism, and the sliding table in accordance with a detected length of pipe received by the cutting apparatus.

* * * * *